United States Patent [19]

Cirami

[11] 4,201,095
[45] May 6, 1980

[54] SEMI-AUTOMATIC GEARSHIFT FOR DUAL DERAILLEUR BICYCLE

[75] Inventor: Salvatore Cirami, Long Island City, N.Y.

[73] Assignee: Jack Myles, Freeport, N.Y. ; a part interest

[21] Appl. No.: 911,460

[22] Filed: Jun. 1, 1978

Related U.S. Application Data

[63] Continuation-in-part of Ser. No. 763,604, Jan. 28, 1977, abandoned, Continuation-in-part of Ser. No. 607,432, Aug. 25, 1975, abandoned.

[51] Int. Cl.² ............... F16H 9/00; G05G 9/00; G05G 13/00
[52] U.S. Cl. .................. 74/217 B; 74/471 R; 74/489
[58] Field of Search ............... 74/217 B, 471 R, 489

[56] References Cited

U.S. PATENT DOCUMENTS

| | | | |
|---|---|---|---|
| 2,788,676 | 4/1957 | Spexarth | 74/489 |
| 2,874,587 | 2/1959 | Schmid | 74/488 |
| 3,752,006 | 8/1973 | Bartlett | 74/489 |
| 3,808,907 | 5/1974 | Yamaguchi | 74/217 B |
| 3,901,095 | 8/1975 | Wechsler | 74/217 B |
| 3,929,025 | 12/1975 | Perry | 74/217 B |
| 3,965,763 | 6/1976 | Wechsler | 74/217 B |
| 4,023,424 | 5/1977 | Ryan et al. | 74/217 B |

FOREIGN PATENT DOCUMENTS

1186766  2/1965  Fed. Rep. of Germany ............ 74/488

*Primary Examiner*—Henry C. Yuen

[57] ABSTRACT

A single, manually operated lever rotates cam means providing guide surfaces that program a progressive series of different drive ratio combinations of the front and rear sprockets of a conventional 10-speed bicycle. The gearshift is mounted on and projecting forwardly from the bicycle's handlebar next to the handlebar stem. The lever has a limited range of movement in a fore and aft direction and can be placed in any one of six drive ratio positions. The lowest and highest drive ratio combinations of the front and rear sprockets are obtained automatically when the lever is placed in its rearwardmost and forwardmost positions, respectively, and intermediate drive ratios are obtained in consecutive increments ordered from the lowest to the highest drive ratio positions of the lever. The guide surfaces have cooperating cam followers to which the control cables for the front and rear derailleurs are attached. At each of the drive ratio positions of the lever the guide surfaces cooperate to affect the relative position of the cam followers and the resultant adjustment of the cables, thereby simultaneously controlling the sprocket alignment position of both the front and rear derailleurs of the bicycle.

4 Claims, 6 Drawing Figures

SEMI-AUTOMATIC GEARSHIFT FOR DUAL DERAILLEUR BICYCLE

CROSS-REFERENCE TO RELATED APPLICATIONS

This application is a continuation-in-part of Ser. No. 763,604, filed Jan. 28, 1977 abandoned and a continuation-in-part of Ser. No. 607,432, filed Aug. 25, 1975 abandoned.

Benefit of the filing date of the original application is claimed for the common subject matter pertaining to the control of spring-biased derailleurs as defined herein. Benefit of the filing date of the second application is claimed for the common subject matter pertaining to the control of pull-pull and push-pull types of positively positioned derailleurs as defined herein.

The common subject matter is a bicycle gearshift in which a single handle member positions cam means that simultaneously controls both derailleurs of a dual derailleur bicycle such that in response to the position of the handle member a progressive series of drive ratios is necessarily obtained.

BACKGROUND OF THE INVENTION

1. Field of the Invention

The context in which the invention finds application is the conventional 10-speed bicycle, more particularly, the three types of derailleurs and their control cables with which the 10-speed bicycle may be equipped.

A conventional 10-speed bicycle includes two front sprockets that differ from each other in pitch diameter and are mounted for rotation together around the pedal crank axis, five rear sprockets that differ from each other in pitch diameter and are mounted for rotation together around the rear wheel axis, and a closed loop of roller chain that connects together one each of the front and rear sprockets. Different drive ratios are affected between the pedal crank and rear wheel axes depending upon the pitch diameter of the front and rear sprockets that are connected together by the roller chain. The bicycle also includes a front derailleur for pushing a forward portion of the roller chain from one to another of the front sprockets, and a rear derailleur for pushing a rearward portion of the roller chain from one to another of the rear sprockets. The derailleurs directly determine which of the front and rear sprockets will be connected together by the roller chain; the sprocket alignment position of the derailleurs thereby determining the drive ratio that will be effected between the pedal crank and rear wheel axes. Each derailleur is actuated by cable means that extends from the derailleur to a gearshift device that is located somewhere on the bicycle that is within manual reach of the seated cyclist.

The conventional gearshift comprises a support bracket that, most popularly at the present time, is attached to the handlebar stem -the gooseneck-shaped structure that supports the bicycle's handlebar at its center; and includes two levers that are pivotably attached to the support bracket on opposite sides of the handlebar stem. The levers are movable about ninety degrees from an upright position to a rearwardly projecting horizontal position. The cable coming from the front derailleur is attached to one lever and the cable coming from the rear derailleur is attached to the other lever. When the cyclist moves one of the levers the attached cable is moved and the derailleur that is connected at the opposite end of that cable is moved from one sprocket alignment position to another.

A derailleur is a device that pushes or derails the roller chain off one sprocket and guides it onto the next one. But to do this, the roller chain has to be moving around the sprockets, that is, the sprockets have to be rotating and, in addition, the roller chain must not be clinging too tightly to the connected sprockets. This means that a derailleur can be operated only when the bicycle is rolling so that the roller chain is moving around the connected front and rear sprockets, and also, that the cyclist has to either coast or at least not be pedaling hard during the time when he is moving the levers of the gearshift.

"Difficulty in shifting gears" is cited by the United States Consumer Product Safety Commission in its publication: "Fact Sheet No. 10: Bicycles", as one of the prime causes of accidents associated with bicycles.

Cyclists frequently have a problem memorizing the operating sequence and accurately positioning the two levers of the conventional gearshift. The attention and manipulative skill required to effect the desired drive ratio, or to correct one inadvertently obtained, distracts the cyclist's attention from the road ahead and the surrounding traffic. An accident is sometimes the result.

Especially for beginners, it is frequently necessary to glance downward and rearward at the front and rear sprocket clusters to confirm attainment of the desired combination of the front and rear sprockets. An obvious hazard.

On bicycles having spring-biased derailleurs, and especially where the levers of the conventional gearshift are infinitely adjustable within their limited range of movement, it is difficult to center the roller chain on the selected sprockets. If the chain is not perfectly centered on the sprockets it chatters disturbingly. This not only tends to alarm the cyclist, but it requires a further adjustment of the position of one or both levers to correct the condition, thereby further distracting the cyclist's attention from his driving; again setting the stage for an accident.

Often, a change from the highest to the lowest drive ratio has to be made quickly and with the roller chain perfectly centered on the selected sprockets, as when the cyclist arrives at the foot of a steep hill. If a low enough drive ratio is not obtained in time, the bicycle will stall; the derailleurs cannot then be shifted and the cyclist will have to walk the bicycle to the top of the hill. If the low drive ratio was obtained but the roller chain not perfectly centered, the increased pedal pressure normally applied in going up a steep hill and the resultant increase in chain tension, could result in damage to the rear derailleur, particularly to its idler sprockets, which are made of a hard plastic.

A conventional derailleur is herein defined as one having a support bracket that is adapted for attachment to the bicycle's frame near a given cluster of sprockets, a transfer cage that engages the bicycle's roller chain for pushing it off one sprocket and guiding it onto another, and linkage means connecting the transfer cage directly to the support bracket. The linkage means serves to hold the transfer cage in an upright position while at the same time permitting it freedom to move laterally across the sprockets, that is, alternately in opposite directions along an axis that is more or less parallel to the pedal crank or rear wheel axis around which the sprockets rotate. In addition, the linkage means provides a convenient place for attachment of the cable means that actuates the derailleur. The linkage means most commonly comprises a paralleleogram mechanism; the transfer cage and support bracket being secured to opposite parallel bars of the mechanism. The linkage means functions merely to support and transmit a force or motion, and not to provide guidance for the transfer cage for placement of it in any particular sprocket alignment position. The characterizing structure of a conventional derailleur is the presence of linkage means connecting the transfer cage directly to the support bracket; the characterizing and distinguishing mode of operation is that of the transfer cage being moved by and directly in response to the position of the cable means. The position of the cable is determined by a gearshift. The term "gearshift" is used herein in the sense of "means for moving a cable alternately in opposite directions".

Three types of derailleurs fitting the above description are now in wide use: the spring-biased type of derailleur and two types of positively positioned derailleurs, the pull-pull and the push-pull.

The spring-biased derailleur incorporates a spring that impels the transfer cage toward one end of the sprocket cluster. A single cable wire is connected effectively to one side of the transfer cage in opposition to the spring bias and extends tautly therefrom to the conventional gearshift lever that controls that derailleur. Movement of the lever in one direction pulls the cable and the cable pulls the transfer cage into another sprocket alignment position against the resistance of the spring bias. Movement of the lever in the opposite direction slackens the cable thereby permitting the spring bias to return the transfer cage to a previous sprocket alignment position.

The difficulty of precisely centering the transfer cage of the spring-biased type of derailleur in alignment with a given sprocket prompted the Shimano American Corporation to introduce a derailleur having indexing detent means for perfecting the centering of the transfer cage. But to enable the detent means to do its job, it was necessary to eliminate the spring bias so that in the "at rest" position there would be no force impelling the transfer cage in one direction out of the grip of the detent means. This type of derailleur is presently marketed under the tradename "Positron" and is referred to by its manufacturer as being "positively positioned". Initially it was offered in a "pull-pull" version. Later a "push-pull" type appeared on the market.

In the pull-pull type of positively positioned derailleur, what amounts to two cable wires are effectively connected to opposite sides of the transfer cage, the opposite ends of the cables being connected to and extending tautly from opposite sides of the gearshift lever that controls that derailleur. Movement of the lever in one direction pulls one cable and slackens the other, thereby pulling the transfer cage in a first direction toward an alternate sprocket alignment position. Movement of the lever in the opposite direction reverses the roles of the cables so that the transfer cage is pulled back to a previous sprocket alignment position. In practice, a single cable wire is used that is twice the length used in the spring-biased type of derailleur, the cable wire being folded in half so as to provide two half-segments, the midpoint of the cable being fixed to the lever so that the two half-segments extend from opposite sides of the lever, the ends of the single wire being connected, in effect, to opposite sides of the transfer cage.

In the push-pull type of positively positioned derailleur a single cable wire of ordinary length is again used, but it is of a stiffer construction and is necessarily sheathed by a flexible armored casing that serves to guide the cable wire and prevent it from buckling, the cable wire being connected between one side of the gearshift lever and, in effect, to one side of the transfer cage and being used to push the transfer cage as well as to pull it.

In all three instances the transfer cage depends for movement from one sprocket alignment position to another upon the position in which the actuating cable means is placed by the gearshift means. All three types of derailleurs are therefore appropriately within the field of the invention.

The difficulties experienced with the conventional gearshift/derailleur system are perceived as being caused by the conventional two-lever gearshift and not by the derailleurs, at least they are solvable by substituting a semiautomatic gearshift according to the present invention for the conventional gearshift. Others have tended to fault the derailleurs. For example, the Shimano American Corporation which makes both gearshifts and derailleurs, added the Positron derailleurs to its line to correct at least the chattering problem caused by the transfer cage of the spring-biased type of derailleur not being perfectly aligned with the selected sprocket. Others have designed radically new types of derailleurs or complete transmission systems, even resorting to modifications of other parts of the bicycle to make the bicycle compatible with their proposed solution. This shows that the art has looked away from the present solution which is that of cam means for programming the sprocket alignment position of both derailleurs, simultaneously; the cam means being incorporated in a manually operated, single lever gearshift.

This combination of ideas is a significant advance in the art because (1), it provides a gearshift that not only solves all of the problems described but at the same time retains the advantages presently being provided by the conventional gearshift, thereby presenting a serious challenge to the entrenched position of the conventional gearshift and therefore likely to result in the new benefits being made available to the public; and (2), they result in a gearshift that is entirely compatible with the normal mode of operation of a conventional 10-speed bicycle, that is, one having derailleurs. These points are amplified below because they assist in defining the field of the invention and have not previously been given sufficient consideration by prior workers in the field of the invention.

Comparison With Conventional Gearshift

The most important feature of a 10-speed bicycle is its light weight compared to other types of bicycles, enabling it to be driven relatively great distances with much less effort. Manufacturers study every component for new opportunities to further reduce weight. Every ounce added by a proposed improvement in a component reduces the likelihood of the public ever enjoying whatever benefits it may otherwise offer. The present semi-automatic gearshift is comparable in weight to the conventional gearshift; the ideas characterizing the invention making possible a physical embodiment that, like the conventional gearshift, has few parts, each of which is small in size.

Understandably, 10-speed bicycles in the lowest price range category are in greatest demand and this market is supplied by many manufacturers who, because they cater to an economy-minded public, produce an extremely cost competitive product. It matters little that the gearshift can be technically improved if an increased cost resulting from inherent complexity or necessity of expensive manufacturing methods or necessity of prerequisite modification of other components of the bicycle contributes to pricing the bicycle as a whole out of its competitive position. Like the conventional gearshift, the present semiautomatic gearshift is susceptible to manufacture by inexpensive methods as a result of which it is competitively low in cost of manufacture.

Bicycles in the lowest price range category, because frequently purchased for use by youngsters, are likely to be treated roughly and receive little maintenance. Like the conventional gearshift, the present semi-automatic gearshift is characterized by an inherently rugged mechanical design resulting from extreme simplicity and is foolproof in operation under conditions of abusive treatment and infrequent maintenance.

All of these benefits flow from the particular combination of ideas characterizing the present invention. As a consideration of the prior art will show, all previous attempts at improvement have resulted in either substantially heavier means, or, means that would be significantly more costly to manufacture, or, more complicated means more likely to get out of order, or, have simply not provided a complete solution of all of the problems described.

Mode of Operation of 10-Speed Bicycle

In the operation of a 10-speed bicycle it is normal to shift from lower to higher drive ratios or "gears" in accordance with the increasing ease with which the bicycle pedals, and to downshift in accordance with any substantially increased difficulty with which the bicycle pedals. Upgrades and low hills that one never notices when traveling by automobile are negotiated comfortably only by a skillful and timely combination of rapid gearshifting and minor variations in applied pedal pressure. The cyclist desires to maintain his momentum at all times, but particularly when riding as part of a group, and it is always desirable that he maintain a uniform pedaling cadence so as not to waste energy, particularly on a long trip.

He normally travels in highest gear when on a level road or a downgrade, using moderate pedal pressure. At the foot of a rise he decreases pedal pressure momentarily so that the derailleurs can be operated, downshifts quickly, and, at the moment the lower gear has been attained, reapplies a moderate or slightly increased pedal pressure to prevent or at least minimize loss of momentum. At the crest of the rise he again decreases pedal pressure momentarily so that the derailleurs can be operated, shifts quickly back to highest gear and again bears down on the pedals to recover whatever momentum he may have lost.

When the cyclist sees that he is approaching a hill he does not downshift before arriving at the foot of the hill because the bicycle is already rolling faster than the lower drive ratio would propel it. If he downshifted too soon, his pedaling would have no effect and he would begin to lose the momentum needed to climb the hill. If he tried to retain that momentum by pedaling faster, he would be wasting energy and exhaust himself early in the trip. He was to wait until he is at the foot of the hill and then shift to a low enough gear before the effect of gravity slows the bicycle so much that the derailleurs cannot be operated. There are a critical few seconds during which time the pedals can be rotated no more than a couple of full turns in a zero or lightly loaded condition. In other words, the roller chain must be kept moving around the sprockets but there must be very little chain tension, so that the derailleurs can be operated, and these conditions can be maintained for only a few seconds.

Downshifting can never be effected when climbing a steep hill because the extreme pedal pressure needed to keep the bicycle moving and therefore the roller chain moving around the sprockets, prevents operation of the derailleurs. Not only must the shift be completed at the foot of a hill, but if it is a steep one, intermediate drive ratios may have to be skipped to obtain a sufficiently low gear in time.

As anyone who has ridden a bicycle knows, it is easier to keep a bicycle rolling than it is to get it started. This is particularly true for a 10-speed bicycle that has been brought to a stop while still in its highest drive ratio configuration. For this reason, when the cyclist is traveling in highest gear and sees that he is approaching a red traffic light or otherwise anticipates coming to a stop, he downshifts before he has to shift his hands to the brakes, so that when the bicycle stops it will be in a lower drive ratio configuration and therefore be easy to start up again.

The conventional gearshift facilitates the above described mode of operation. Because it is manually operated it permits the cyclist to use his judgement as to which drive ratio is needed in a given situation, and when the shift should be effected. It permits the cyclist to shift between extremes in drive ratio. And it permits the cyclist to establish the pedal pressure conditions at the time the derailleurs are operated. All this is equally true of the present semi-automatic gearshift, in which the lever is manually operated and in response to the position of the lever the gearshift automatically obtains the desired combination of the bicycle's front and rear sprockets. In the closest approach of the prior art, these considerations have not been given sufficient expression.

Other Considerations Pertaining to Field of Invention

Most cyclists normally ride a 10-speed bicycle with their hands on the midportion of the handlebar on opposite sides of the handlebar stem, so the described mounting of the conventional gearshift is the most accessible so far provided. Because in that mounting the gearshift is steerable with the handlebar it is necessary that regardless of the type of derailleur the cable wires be sheathed by flexible armored casings, at least between the gearshift and a point on the bicycle such as its frame that is fixed in position relative to the derailleurs. This is to enable the cable wires to function as intended while still permitting the bicycle to be steered. On some bicycles the gearshift is mounted on the bicycle's frame where the gearshift is fixed in position relative to the derailleurs and so the cables do not have to be sheathed by casings. When the gearshift is steerably mounted it has to include means for securing one end of the casings; when non-steerably mounted such means may or may not be included, as preferred, depending upon whether or not casings are used. The appended claims skip over these details because obvious to those skilled in the art, as demonstrated by the various embodiments of the conventional gearshift.

2. Description of the Prior Art

The searches made by the U.S. Patent Office in the course of examining the two previous applications for patent for the present invention produced two groups of patents, all of which were cited merely as of interest or to establish the state of the art; none being cited as a reference to be overcome. No more pertinent art is presently known. In the file of original application Ser. No. 607,430:

1. U.S. Pat. No. 2,874,587 issued 2/1959 to Schmid.
2. U.S. Pat. No. 3,752,006 issued 8/1973 to Bartlett.
3. U.S. Pat. No. 2,788,676 issued 4/1957 to Spexarth.
4. German Pat. No. 1,186,766 issued 2/1965 to Kvetna.
5. U.S. Pat. No. 3,901,095 issued 8/1975 to Wechsler.
6. U.S. Pat. No. 3,965,763 issued 6/1976 to Wechsler.

In the file of second application Ser. No. 763,604:

7. U.S. Pat. No. 3,929,025 issued 12/1975 to Perry.
8. U.S. Pat. No. 4,023,424 issued 5/1977 to Ryan et al.
9. U.S. Pat. No. 3,808,907 issued 5/1974 to Yamaguchi.

The Schmid, Bartlett, Spexarth and Kvetna patents pertain to twist-grip controls mounted in the end of the handlebar of a bicycle or motorcycle, cited because a claim was presented for an embodiment of the present gearshift that is mounted in the end of the bicycle's handlebar. That embodiment is no longer preferred. The Wechsler, Perry and Ryan patents show that the idea of using cam means at some point in the transmission system of a multispeed bicycle has been considered but has not previously been applied as is presently taught. The Yamaguchi patent is for a single-lever gearshift for independent or simultaneous control of two derailleurs.

Wechsler perceived the faults of the conventional gearshift/derailleur system to lie with the derailleurs and designed a complete transmission system including new front and rear derailleurs each of which incorporates rotatable cam means located between the transfer cage of each derailleur and its support bracket in substitution for the linkage means used in conventional derailleurs. He coordinated the movements of the derailleurs by tying the cams together with a closed loop of cable. Movement of a single gearshift member, such as a rotatable knob that turns a drum around which the cable is wound, simultaneously rotates both cams. In accordance with the configuration of the cams, the derailleurs assume the programmed sprocket alignment positions, utilizing all ten drive ratios that can be effected. This idea does nothing for the millions of 10-speed bicycles that have conventional derailleurs and control cables. It requires the manufacture of not only a new gearshift per se for control of the special cable, but also of new front and rear derailleurs and the special cable.

The Perry patent is for a gearshift per se and is directed toward the attainment of fully automatic operation of any type of "ratio changing means", an expression used to encompass any type of device that can effect different drive ratios in response to the positioning of a control cable; for example, devices as different as derailleurs and 3-speed wheel hubs. The patent illustrates and describes only one embodiment of the gearshift. The type of "ratio changing means" selected to illustrate the mode of application of the invention is a rear derailleur mounted on a bicycle having only one front sprocket, and therefore no front derailleur, and a cluster of rear sprockets. The Perry automatic gearshift includes a single cam and cam follower for positioning the cable that actuates the rear derailleur, but the allegation is made that "a second cam can be employed for control of a front derailleur". This is not supported by the disclosure; it would require modifications amounting to additional invention to achieve that result.

The Perry gearshift is essentially a pedal pressure sensing mechanism that, of necessity, has to engage the bicycle's roller chain immediately above the front sprocket, the gearshift having to be mounted on the bicycle's frame immediately above the pedal crank housing, thereby leaving no room for the mounting of a front derailleur. The roller chain has to be carried on the free end of a pivotable control arm that extends above the front sprocket. Variations in pedal pressure result in variations in chain tension. The free end of the control arm is held in a normally raised position by a spring bias. When chain tension is increased, the free end of the control arm is pulled downwardly; when chain tension is decreased, the free end of the control arm is allowed to return to a higher raised position. This results in rotation of a cam that is attached to the control arm. The cam affects the position of its cam follower, which in turn, affects the position of the control cable that extends from the rear derailleur.

The Perry gearshift is the closest approach of the prior art because it shows the use of cam means in a gearshift per se for control of a derailleur. But it is not designed for control of two derailleurs, and does not teach the idea of programming two derailleurs to achieve a progressive series of drive ratios.

It is obvious that a front derailleur could not be used in conjunction with the Perrry gearshift because it is in the nature of a derailleur that its transfer cage has to contact the roller chain as close as possible to the point where the roller chain enters into engagement with the sprocket. The reason is the inherent ability of a roller chain to accept considerable misalignment relative to its own longitudinal axis. If the transfer cage is not close enough to the sprocket, the roller chain can be pushed back and forth laterally and still not be forced off the sprocket. On a bicycle equipped with the Perry gearshift, at the point where a front derailleur would be mounted, the roller chain is far removed from the front sprocket; it is carried high above the front sprocket on the free end of the control arm of the gearshift.

In addition, the control arm of the Perry gearshift has to pivot up and down across the area where a front derailleur would be located, thereby presenting a structural interference, because the transfer cage and linkage means of the derailleur have to extend laterally from the bicycle's frame to the front sprockets.

The cam means used in the Perry gearshift and in the present disclosure, give physical expression to different ideas; their similarity is therefore only apparent, not real. They give physical expression to different characterizing ideas that identify different unitary results conceived. To illustrate: the number of degrees of arc through which the control arm of the Perry gearshift pivots remains the same irrespective of what type of "ratio changing means" is being controlled by the cable that is connected to the cam follower. A derailleur may require a different magnitude of movement of its cable than a 3-speed wheel hub. The purpose of the cam in the Perry gearshift is therefore to provide different numbers of specific positions of the cable as needed for a rear derailleur or a 3-speed hub, utilizing the same magnitude of movement of the control arm. In the present invention the cam means is used for the purpose of coordinating the movement of two derailleurs.

As used in combination with the other elements of the Perry gearshift, the cam means does not make an addition to the sum of knowledge in the art of gearshift means for control of derailleurs, for the very fact that it is fully automatic in operation. It responds to a gear-shifting situation after that situation is already in being, at which time it may be too late. It does not permit the cyclist to anticipate the necessity or desirability of a shift in gears. These points are amplified below.

The Perry gearshift can be used to control a 3-speed or 5-speed rear wheel hub because this type of "ratio changing means" can be shifted at any time, even when pedaling up a hill. But it is not suitable for use with a derailleur because pedal pressure has to be decreased when a derailleur is shifted. The Perry gearshift does not shift to a lower gear at such times.

When the bicycle is pedaling easily on flat terrain the Perry automatic gearshift will be in highest gear. When a steep hill is approached the Perry gearshift will not shift automatically to a lower gear at the foot of the hill because there will have been no increase in pedal pressure to activate the gearshift; instead it will wait until the bicycle is already on the hill, at which time the greatly increased pedal pressure and resultant chain tension necessary to keep the bicycle rolling will either prevent operation of the derailleur or result in damage to the derailleur. It should be borne in mind that not only is the transfer cage of a conventional rear derailleur necessarily mounted in a relatively fragile manner, pivoting as it does on the end of a paralleogram mechanism, but the two idler sprockets it carries are made of a hard plastic, not steel, and are therefore subject to breakage if overloaded.

The incompatibility of Perry's gearshift with a derailleur manifests itself again in the situation where the cyclist sees a red traffic light ahead and wants to shift to a lower gear before coming to a stop so that it will be easy to get started again. With a manual gearshift, he decreases pedal pressure and then shifts the derailleur before he has to move his hands to the brakes; i.e., the shift to the lower gear has to be made before the stop, not after it. The Perry gearshift cannot obtain a lower gear before the stop because there will be no increase in pedal pressure: the cyclist will be coasting, not pedaling harder.

Another limitation of the Perry gearshift making it unsuitable for use with a derailleur is the inclusion in it of a mechanism that prevents it from skipping drive ratios and requiring that the pedal crank be rotated a full turn for each shift. At the foot of a steep hill the lowest drive ratio could not be obtained before the bicycle stalled —the roller chain has to be in motion around the sprockets and in a zero or at least lightly loaded condition in order for the derailleur to be shifted. In traffic, the cyclist is often confronted by a red traffic light only at the last moment, necessitating sudden changes between nonconsecutive drive ratios; the Perry gearshift does not permit sudden changes between extremes in drive ratio.

It might appear that Perry's control arm anticipates the idea of using, in a gearshift, a single lever connected to cam means for control of a conventional derailleur as in the present invention. That this is not so is clear from the fact that Perry'control arm is a lever that is structured to carry a roller chain and functions to pivot automatically in response to variations in chain tension caused by variations in pedal pressure; whereas in the present invention, the lever is structured to be grasped manually and functions to provide a means for manual placement of the cam means in its several drive ratio positions.

The Ryan patent is for a rear derailleur, not for a gearshift per se. Like Wechsler, Ryan also shows a recognition that cam means might be used to solve the problems of the conventional gearshift/derailleur system, but he too perceived the fault to lie with the derailleurs rather than with the gearshift. He designed a rear derailleur in which the cam means is a slotted structure that is part of the support bracket. The transfer cage moves within the slots and is thereby guided into different sprocket alignment positions. A handle is attached to the transfer cage for pushing it through the slots.

Yamaguchi however, worked within the context of conventional front and rear derailleurs and their control cables, seeing at least part of the problem as being that of having to work the two levers of the conventional gearshift. His patent is for a single-lever gearshift in which a fore and aft movement of the lever controls the front derailleur and, a side to side movement of the same lever controls the rear derailleur. The lever can be moved in either direction independently of the other, or, in both directions at the same time. This means that the cyclist can control either derailleur independently of the other, or, both derailleurs at the same time. The lever is held in position by friction means. It thereby achieves the same result as the conventional gearshift; merely substituting a compound movement of one lever for a simple movement of two levers.

His problem was how to convert the side to side movement of the lever into a fore and aft movement of the rear derailleur's cable. He provided five solutions, two of which employ cam means, the others being simpler, one of them being a pulley wheel around which the cable is pulled so as to change its direction ninety degrees. Like the pulley wheel, the purpose of the cam means is only to convert the side to side movement of the lever into a fore and aft movement of the rear derailleur's cable, and not to program any particular sprocket alignment position of the rear derailleur. Yamaguchi therefore does not anticipate the idea of a manually operated gearshift having a single lever that is connected to cam means for programming the sprocket alignment position of a derailleur.

It would seem that Yamaguchi anticipates the general idea of using a single lever for simultaneous control of front and rear derailleurs. But in the Yamaguchi gearshift simultaneous control of both derailleurs is the result of the manipulative skill of the cyclist in correctly placing the lever at just the right compound position. This presents the cyclist with a problem that is equivalent to that presented by the conventional gearshift which requires that the two levers be correctly positioned relative to each other; Yamaguchi merely substituting a new cause of difficulty for an old one. Since Yamaguchi's lever is held in position by friction means like most conventional gearshifts, it is just as difficult to effect a progressive series of drive ratios with his gearshift as with the conventional gearshift. The cyclist has to memorize a sequence of compound movements of a single lever instead of a sequence of relative fore and aft positions of two levers.

SUMMARY OF THE INVENTION

1. DEFINITION OF PATENTABLE INVENTION

In "The Nature of Patentable Invention" by Mr. John E. R. Hayes of the Boston Bar, Addison-Wesley Press, Inc., 1948; a definition of patentable invention is given that, in only slightly revised form, is recited below. The substantive change is the substitution of "unitary result conceived" for "new and useful result", to make clear that, as is taught in the book, the definition is not referring to any benefit that may result from use of the invention, but rather to the invention itself. The disclosure of the present invention and the claims for same appended hereto draw on the language of this definition.

PATENTABLE INVENTION IS A MENTAL CONCEPT OF A UNITARY RESULT CONCEIVED CHARACTERIZED BY AN IDEA OR A COMBINATION OF IDEAS THAT IS NEW, ORIGINAL, CREATIVE AND ADDS TO THE SUM OF KNOWLEDGE IN THE ART TO WHICH THE CONCEPT PERTAINS, INCLUSIVE OF A MODE OF PHYSICAL ATTAINMENT

This definition says that the essence of the invention is the mental concept of a unitary result conceived and that the mode of physical attainment merely gives physical expression to the unitary result conceived. It says further that the unitary result conceived is identified by the ideas that characterize it, and that, to be patentable at least one of these ideas must be new, original, creative and additive to the sum of knowledge in the art to which the mental concept pertains.

By "new" is meant: not previously known or used by others; expressive of more than the known or inherent function, attribute or property of the mode of phyiscal attainment.

By "original" is meant: out of the ordinary; unhabitual; not merely the carrying forward of existing knowledge.

By "creative" is meant: brings into being something that did not exist before; could not be imputed from existing knowledge; not the revelation of something which exists and was unknown; not a mere discovery.

By "adds to the sum of knowledge" is meant: not within the circle of what was known before in the art to which the mental concept belongs.

The definition says that the ideas that characterize the unitary result conceived are to be evaluated for the above qualities relative to the art to which the mental concept pertains.

2. APPLICATION OF DEFINITION TO PRESENT INVENTION

THE ART TO WHICH THE CONCEPT PERTAINS

The art of gearshift means for the control of conventional derailleurs. The term "gearshift" is used here in the sense of "means for moving a cable alternately in opposite directions", because that is the essential function of the conventional gearshift that the present invention is designed to improve upon. This excludes a derailleur per se, like Ryan's device; or a a single device that combines a derailleur with the means for controlling the derailleur, like Wechsler's device. Such devices are for different arts because their essential function is not that of "moving a cable alternately in opposite directions". A derailleur functions to move a roller chain alternately in opposite directions. A complete transmission system like Wechsler's device, functions to effect different drive ratios between the pedal crank and rear wheel axes. The term "conventional" means that the device is commonly seen on 10-speed bicycles. As applied to derailleurs, it is intended to bring to mind the structural and functional characteristics that the three different types of derailleurs now in wide use have in common: the presence of linkage means connecting the transfer cage directly to the support bracket, and the guidance of the transfer cage from one sprocket alignment position to another exclusively as a result of and directly in response to the position of the controlling cable means.

THE MAIN INVENTION

THE UNITARY RESULT CONCEIVED

A semi-automatic gearshift characterized and identified by:

the idea of a single handle member that has a limited range of movement alternately in opposite directions only, and is placeable in given drive ratio positions; in combination with the idea of the single handle member being connected to position cam means that provides first and second guide surfaces that determine the relative position of first and second cam followers for simultaneous control of the position of first and second cable means that are connected, in effect, to the front and rear transfer cages, respectively, of a bicycle having plural front and rear sprockets and conventional front and rear derailleurs; in combination with the idea of the cam means programming a progressive series of different drive ratio combinations of the front and rear sprockets, such that, the lowest and highest drive ratio combinations are obtained at extreme opposite drive ratio positions of the handle member and intermediate drive ratio combinations are obtained in consecutive increments ordered from the lowest to the highest drive ratio positions of the handle member.

THE MODE OF PHYSICAL ATTAINMENT

A support bracket adapted for attachment to the bicycle and carrying relatively movable cam means providing first and second guide surfaces; the support bracket also carrying first and second cam followers that cooperate with the first and second guide surfaces, respectively; the guide surfaces being placeable in any one of multiple drive ratio positions by a single handle member that is connected to the cam means to position its guide surfaces relative to the cam followers; the first and second cam followers being adapted for attachment to the cable means provided by the front and rear derailleurs, respectively, of the bicycle. Means being included to restrict the handle member and guide surfaces to movement alternately in opposite directions only; means being included to ensure the stable placement of the guide surfaces relative to the cam followers in given drive ratio positions; and, for control of positively positioned derailleurs, means being included to ensure that the cam followers necessarily follow their cooperating guide surfaces.

A SECOND SUBORDINATE INVENTION

THE UNITARY RESULT CONCEIVED

The same as for the main invention, further characterized by:

the idea of the first and second guide surfaces programming a progressive series of only six usefully different drive ratio combinations of the two front and five rear sprockets of a 10-speed bicycle that avoids extreme misalignments of the bicycle's roller chain relative to its own longitudinal axis and minimizes the necessary range of movement of the handle member of the gearshift.

THE MODE OF PHYSICAL ATTAINMENT

Where the smaller and larger pitch diameter front sprockets are designated A and B, respectively, and the largest to the smallest pitch diameter rear sprockets are designated consecutively 1, 2, 3, 4, 5: the first and second guide surfaces being placeable in only six drive ratio positions designated (1), (2), (3), (8), (9), (10); the guide surfaces being configured at the drive ratio positions to program the front/rear sprocket combinations A-1, A-2, A-3, B-3, B-4, B-5, respectively.

BRIEF DESCRIPTION OF THE DRAWINGS

FIG. 4 shows how the cams and their interconnecting elements shown in exploded relationship in FIG. 3 are assembled together onto the gearshift's support bracket, FIG. 4 showing their relationship after assembly.

FIG. 5 shows how the cam followers and their interconnecting elements shown in exploded relationship in FIG. 3 are assembled together onto the gearshift's support bracket, FIG. 5 showing their relationship after assembly.

FIG. 6 shows a broken portion front elevation of one of the cam followers and its cable anchoring device shown in exploded relationship in FIG. 3, FIG. 6 showing their relationship after assembly.

DESCRIPTION OF THE PREFERRED EMBODIMENT

Figure 1:
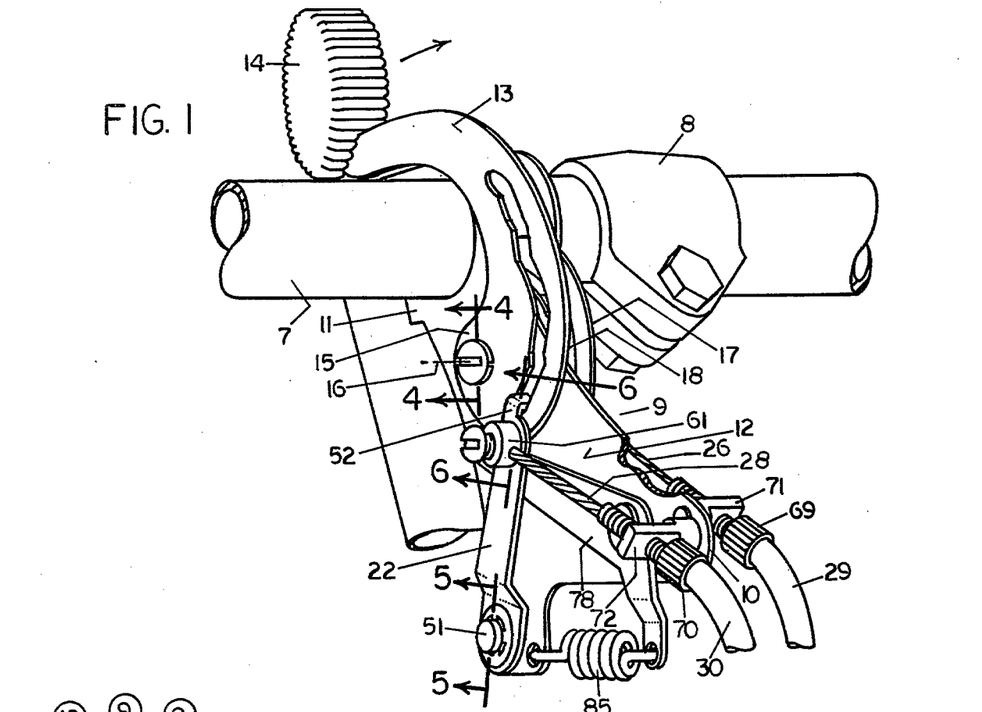
FIG. 1 is a general view in perspective of the preferred embodiment of the invention, a semi-automatic gearshift, fully assembled and installed on the handlebar of a 10-speed bicycle next to the handlebar stem, with the front and rear derailleur control cables connected to the gearshift.

Referring to FIG. 1, there is represented the midportion 7 of the handlebar of a 10-speed bicycle, secured in the handlebar stem 8. The structure embodying the invention includes a support bracket indicated generally as 9, having a forward portion 10, a rearward portion 11 and an intermediate main body portion 12. The rearward portion 11 of the support bracket 9 is attached to the midportion 7 of the handlebar next to the handlebar stem 8 so that the support bracket 9 projects forwardly and hangs in dependence from the midportion 7 of the bicycle's handlebar.

A single handle member in the form of a lever 13 has a free upper end 14 in the form of a knob that is grasped by the cyclist to operate the lever, and a lower end 15 that is secured to the main body portion 12 of the support bracket 9 for rotation around a horizontal axis 16 that parallels the midportion 7 of the bicycle's handlebar. The free end 14 of the lever 13 extends upwardly from its pivot point and rises above the level of the midportion of the handlebar; the lever being shaped so that the free end curves rearwardly of the handlebar. The lever is movable in a fore and aft direction only, that is, parallel to the direction of travel of the bicycle.

The lever 13 can be placed manually in any one of six drive ratio positions. It is shown in FIG. 1 in its rearwardmost position, which obtains the lowest drive ratio combination of the bicycle's front and rear sprockets. The lever can be pushed forwardly from this position to an extreme forwardmost position that obtains the highest drive ratio combination of the front and rear sprockets. A total pivotal movement of the lever through a segment of an arc of about 105 degrees has been found to be satisfactory. The function of the lever 13 is to position rotatable cam means providing first and second guide surfaces that are placed simultaneously in the same drive ratio positions. For compactness, the guide surfaces are located side by side. The illustrated embodiment represents a stamped sheet steel construction in which the two guide surfaces are provided by two distinct cam members 17 and 18. For simplicity and economy of construction, cam member 18 is stamped integrally with the lever 13.

Figure 2:
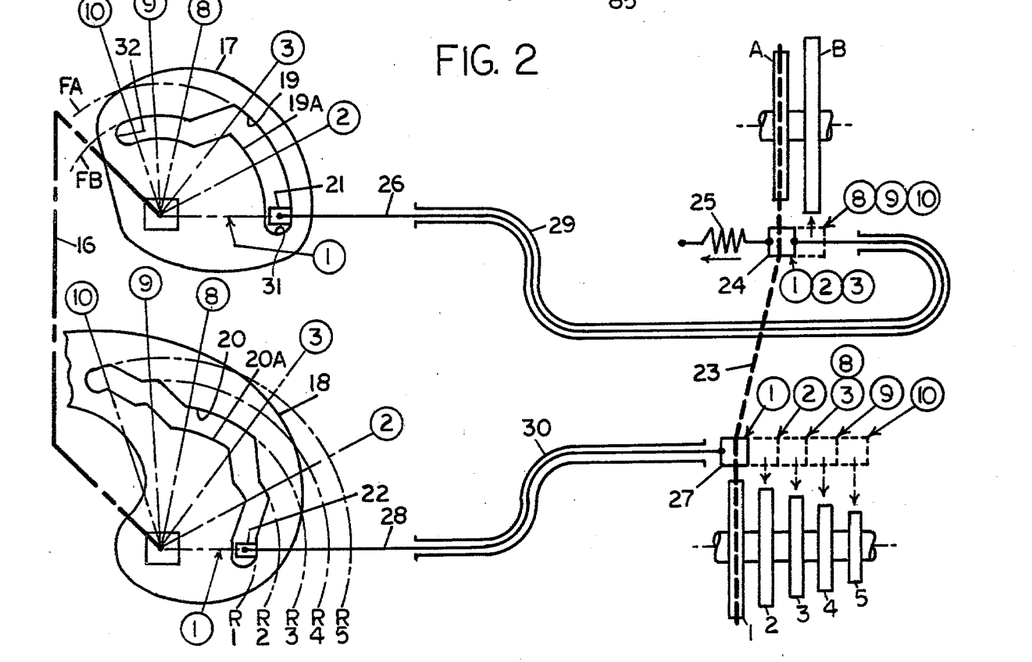
FIG. 2 is a partly pictorial, partly schematic functional diagram illustrating the interaction between the cams of the gearshift and the transfer cages of the front and rear derailleurs of a 10-speed bicycle.

Referring to FIG. 2, cam 17 provides a first guide surface 19 and functions to control the bicycle's front derailleur; cam 18 provides a second guide surface 20 and functions to control the bicycle's rear derailleur. In FIG. 2, rectangles numbered 21 and 22 represent schematically first and second cam followers that ride on the first and second guide surfaces, respectively. Only cam follower 22 is visible in FIG. 1 but both are represented in perspective in FIG. 3.

Still referring to FIG. 2, the pertinent elements of a 10-speed bicycle are represented schematically and include the smaller and larger pitch diameter front sprockets A and B, respectively; the five rear sprockets consecutively numbered 1, 2, 3, 4, 5, counting from the largest to the smallest pitch diameter rear sprockets; a roller chain 23; the front transfer cage 24 of a spring-biased front derailleur having a bias spring 25 that is effectively connected to one side of the front transfer cage 24 and impels the front transfer cage in the direction indicated by the arrow; a first cable means 26 that is effectively connected at one end to the front transfer cage 24 in opposition to the bias spring 25 and is connected at its opposite end to the first cam follower 21; the rear transfer cage 27 of a push-pull positively positioned type of rear derailleur having a second cable means 28 that is effectively connected at one end to one side of the rear transfer cage 27 and is connected at its opposite end to the second cam follower 22. The first and second cable means include casings 29, 30, respectively.

The first cam follower 21 rides on the first guide surface 19. The bias spring 25 pulls the front transfer cage 24 and tries to keep it on the smaller front sprocket A. When the first cam follower 21 is moved toward the pivotal center of cam 17, the first cable means 26 is pulled, thereby pulling the front transfer cage 24 into alignment with the larger front sprocket B against the resistance of the bias spring 25. The first cable means 26 is initially adjusted so that there is no slack in the cable. The bias spring 25 keeps the first cam follower 21 pulled against the first guide surface 19, so in this instance there is no need for the gearshift to include means for positively positioning the first cam follower 21; i.e., means functioning to ensure that the first cam follower necessarily follows the first guide surface. But if the front derailleur were either one of the positively positioned types, that is, one not having a bias spring 25, the gearshift would have to include means for positively positioning the first cam follower 21 relative to the first guide surface 19, and one way of doing that is to provide a first auxliary guide surface 19a, FIG. 2 that is spaced apart from and follows the configuration of the first guide surface 19. When the first cam follower 21 is moved away from the pivotal center of cam 17, the bias spring 25 pulls the front transfer cage 24 back into alignment with the smaller front sprocket A.

The second cam follower 22 rides on the second guide surface 20, which serves to push the second cam follower 22 toward the pivotal center of cam 18. A second auxiliary guide surface 20a cooperates with the second guide surface 20 to push the second cam follower away from the pivotal center of cam 18, thereby providing means for positively positioning the second cam follower 22 relative to the second guide surface 20. The guide surfaces 20, 20a thereby cooperate to push the cable 28 alternately in opposite directions with the result that the rear transfer cage 27 is moved alternately in opposite directions from one rear sprocket alignment position to another.

The initial position of the transfer cages is represented by solid lines and alternate positions are represented by dashed lines accompanied by a small arrow pointing to the sprocket with which the transfer cage is aligned in the indicated alternate position. The six drive ratio positions in which the lever 13 of FIG. 1 and therefore the cams 17, 18 of FIG. 2 can be placed, is indicated in FIG. 2 by means of straight radial reference lines that are superimposed upon the cams. On each of the cams, these lines originate at the pivotal center of the cam, at the horizontal axis 16, radiate outwardly therefrom and terminate at a circle containing a number that identifies a particular drive ratio position. In FIG. 2, these straight radial reference lines are identified by the drive ratio position numbers (1), (2), (3), (8), (9), (10), each of which is enclosed within a circle.

To indicate how the transfer cages are aligned in response to the placement of the lever 13 and cams 17, 18 in each of the drive ratio positions, correspondingly numbered circles are also used in association with the transfer cages; an arrow connecting the circles with the transfer cages. In certain instances, a transfer cage will remain aligned with the same sprocket in more than one drive ratio position. This is indicated in FIG. 2 by means of circles touching each other, containing different drive ratio position numbers and having a common arrow pointing to the transfer cage.

The guide surfaces 19, 20, FIG. 2 can be placed in any one of six drive ratio positions identified by the drive ratio position radial reference lines (1), (2), (3), (8), (9), (10). In each of these drive ratio positions, the points on the surface of guide surfaces 19, 20, that are contacted by their cooperating cam followers are referred to as "drive ratio points". The drive ratio points of each guide surface 19, 20 are located at specific "distance-locations" relative to a common reference, namely, the pivotal center of the cam; in other words, the horizontal axis 16. The drive ratio points of the guide surfaces 19, 20 are located at different distance-locations so as to program different sprocket alignment positions for the transfer cage to be controlled. On each of the cams these different distance-locations are indicated by means of segments of arcs that are superimposed upon the cams and are concentric with the pivotal center of the cams.

The six drive ratio points of the first guide surface 19 are located at two different distance-locations, indicated by concentric reference arcs FA and FB; and this is equal in number to the number of front sprockets: two. This programs two sprocket alignment positions for the front transfer cage 24.

The six drive ratio points of the second guide surface 20 are located at five different distance-locations, indicated by concentric reference arcs R1, R2, R3, R4, R5; and this is equal in number to the number of rear sprockets: five. This programs five sprocket alignment positions for the rear transfer cage 27.

The numbering of the six drive ratio positions is derived from the Drive Ratio Chart shown below. The letters and numbers in FIG. 2 that identify the front and rear sprockets, respectively, are consistent with the method of identification that is used in the owner's manual that accompanies at least one manufacture of 10-speed bicycle. That manual indicates the letter/number combinations of the front and rear sprockets that are to be associated with each of the ten drive ratios that can be effected by a 10-speed bicycle. The Drive Ratio Chart was developed from information provided by the manual, in which it is recommended that only the first and last three drive ratio combinations of the front and rear sprockets be used. In other words, the manual recommends use of only the front and rear sprocket combinations that are obtained in drive ratio positions (1), (2), (3), (8), (9), (10), as shown in the Drive Ratio Chart.

These six drive ratios result in a progressive series of different drive ratio combinations, and in addition, avoid extreme misalignments of the bicycle's roller chain relative to its own longitudinal axis that might result in damage to the rear derailleur or to the roller chain.

The fact that a progressive series of different drive ratios is attained is indicated in the Drive Ratio Chart by means of the "Feet Traveled" column, which shows the distance, measured in feet, that is traveled by the bicycle in response to each full turn of its pedal crank; assuming that the bicycle has a rear wheel that is 27 inches in diameter, and in which the front sprockets A, B, have 40, 50 teeth, respectively; and the rear sprockets 1, 2, 3, 4, 5, have 28, 24, 20, 17, 14 teeth, respectively.

| DRIVE RATIO | DRIVE RATIO CHART | | |
|---|---|---|---|
| | SPROCKETS COMBINED | TEETH COMBINED | FEET TRAVELED |
| 1 | A-1 | 40-28 | 10.0 |
| 2 | A-2 | 40-24 | 11.7 |
| 3 | A-3 | 40-20 | 14.1 |
| 4 | A-4 | 40-17 | 16.6 |
| 5 | A-5 | 40-14 | 20.1 |
| 6 | B-1 | 50-28 | 12.6 |
| 7 | B-2 | 50-24 | 14.7 |
| 8 | B-3 | 50-20 | 17.6 |

-continued
DRIVE RATIO CHART

| DRIVE RATIO | SPROCKETS COMBINED | TEETH COMBINED | FEET TRAVELED |
|---|---|---|---|
| 9 | B-4 | 50-17 | 20.7 |
| 10 | B-5 | 50-14 | 25.2 |

In drive ratio position (1), the first cam follower 21, FIG. 2 is at distance-location FA on the first guide surface 19, so the front transfer cage 24 is aligned with front sprocket A; and the second cam follower 22 is at distance-location R1 on the second guide surface 20, so the rear transfer cage 27 is aligned with rear sprocket 1. This results in the front/rear sprocket combination A-1.

Pushing the lever 13, FIG. 1 forwardly, rotates the cam 17, 18, FIG. 2 clockwise so as to bring the drive ratio position radial reference line (2) on each cam into alignment with its cooperating cam follower, that is, effecting drive ratio position (2).

In drive ratio position (2), the first cam follower 21 remains at distance-location FA therefore the front transfer cage 24 remains aligned with front sprocket A; but the second cam follower 22 is moved to distance-location R2, so the rear transfer cage 27 is moved into alignment with rear sprocket 2. This results in the front-/rear sprocket combination A-2.

Pushing the lever forwardly again brings the drive ratio position radial reference line (3) on each cam into alignment with its cooperating cam follower, effecting drive ratio position (3).

In drive ratio position (3), the first cam follower 21 again remains at distance-location FA, so the front transfer cage 24 remains aligned with front sprocket A; but the second cam follower 22 is again moved, this time to distance-location R3, so the rear transfer cage 27 is again moved, this time into alignment with rear sprocket 3. This results in the front/rear sprocket combination A-3.

Pushing the lever forwardly again brings the drive ratio position radial reference line (8) on each cam into alignment with its cooperating cam follower, effecting drive ratio position (8).

In drive ratio position (8), the first cam follower 21 is moved to distance-location FB, so the front transfer cage 24 is moved into alignment with front sprocket B; but the second cam follower 22 remains at distance-location R3, so the rear transfer cage 27 remains in alignment with rear sprocket 3. This results in the front-/rear sprocket combination B-3.

Pushing the lever forwardly again brings the drive ratio position radial reference line (9) on each cam into alignment with its cooperating cam follower, effecting drive ratio position (9).

In drive ratio position (9), the first cam follower 21 remains at distance-location FB, so the front transfer cage 24 remains in alignment with front sprocket B; but the second cam follower 22 is moved to distance-location R4, so the rear transfer cage 27 is moved into alignment with rear sprocket 4. This results in the front/rear sprocket combination B-4.

A final forward push of the lever brings the drive ratio position radial reference line (10) on each cam into alignment with its cooperating cam follower, effecting drive ratio position (10).

In drive ratio position (10), the first cam follower 21 remains at distance-location FB, so the front transfer cage 24 remains in alignment with front sprocket B; but the second cam follower 22 is moved to distance-location R5, so the rear transfer cage 27 is moved into alignment with rear sprocket 5. This results in the front/rear sprocket combination B-5.

As the Drive Ratio Chart shows, there has been effected a progressive series of drive ratio combinations of the bicycle's front and rear sprockets, a series of consecutive increments in drive ratio ordered from the lowest drive ratio position (1) to the highest drive ratio position (10). Obviously, pulling the lever rearwardly through each of the six drive ratio positions will obtain the same progressive series of different drive ratios but in reverse order, a series of consecutive decrements in drive ratio. It is clear that the cyclist is not required to have any knowledge of which front sprocket is supposed to be combined with which rear sprocket to obtain a particular drive ratio, and, that no manipulative skill is required to effect the necessary front/rear sprocket combinations. The cyclist simply pushes the lever forwardly to get a higher drive ratio, or pulls it rearwardly to get a lower drive ratio.

It is obvious that in each of the drive ratio positions the cam followers are located in a definite position and do not vary from that position. The derailleur cables are therefore held in definite positions and the result is that the transfer cages are kept perfectly centered in alignment with the selected sprockets. This eliminates the chattering problem commonly experienced as a result of the roller chain not being perfectly centered on the engaged sprockets. At the same time, it prevents the roller chain from jumping off the end sprockets in a cluster should the limit screws provided on the derailleurs vibrate out of adjustment. In fact, the limit screws are no longer needed.

To ensure that these results are necessarily obtained, it is necessary that the lever and cams remain in the selected drive ratio position. Two different means are shown for stablizing the lever and cams at any one of the drive ratio positions. The first is the provision of stepped cam means; the second and better one is the provision of indexing detent means that holds the cam followers in alignment with the drive ratio points on the guide surfaces. Both are preferable to friction means for holding the lever.

The stepped configuration of guide surfaces 19, 20 is evident in FIG. 2 where at each of the drive ratio positions a short segment of the guide surfaces 19, 20 is flat as opposed to being inclined, so that there is no tendency of the cooperating cam followers to "slide down a hill". The lever will therefore, at least in theory, remain stable in position at each of the drive ratio positions. In practice, vibration could jar the cams out of position. If the gearshift is intended to be used exclusively with spring-biased derailleurs the flat segments of the guide surfaces 19, 20 can be replaced by recesses into which the cam followers are pulled by the effect of the bias springs of the derailleurs. This method was used on a working model and is satisfactory. For general application, and to provide a more distinct feel to the lever, the indexing detent means is preferred. It will be described in connection with FIG. 3.

To make the lowest and highest drive ratio positions of the lever easy to find the gearshift includes limit means to restrict the lever and cams to movement alternately in opposite directions between extreme opposite drive ratio positions. Since in the preferred embodiment the guide surfaces 19, 20 are each formed within a slot, the limit means conveniently comprises simply the closed ends of the slots which limits the movement of the cam follower riding within the slot. For example, the closed end 31 on cam 17 limits the rearwardmost rotation of the cam, and the closed end 32 limits the forwardmost rotation. Cam follower 21 will therefore abutt against the closed ends 31, 32 if the cam 17 is rotated beyond the extreme opposite drive ratio positions (1) and (10), respectively.

Figure 3:
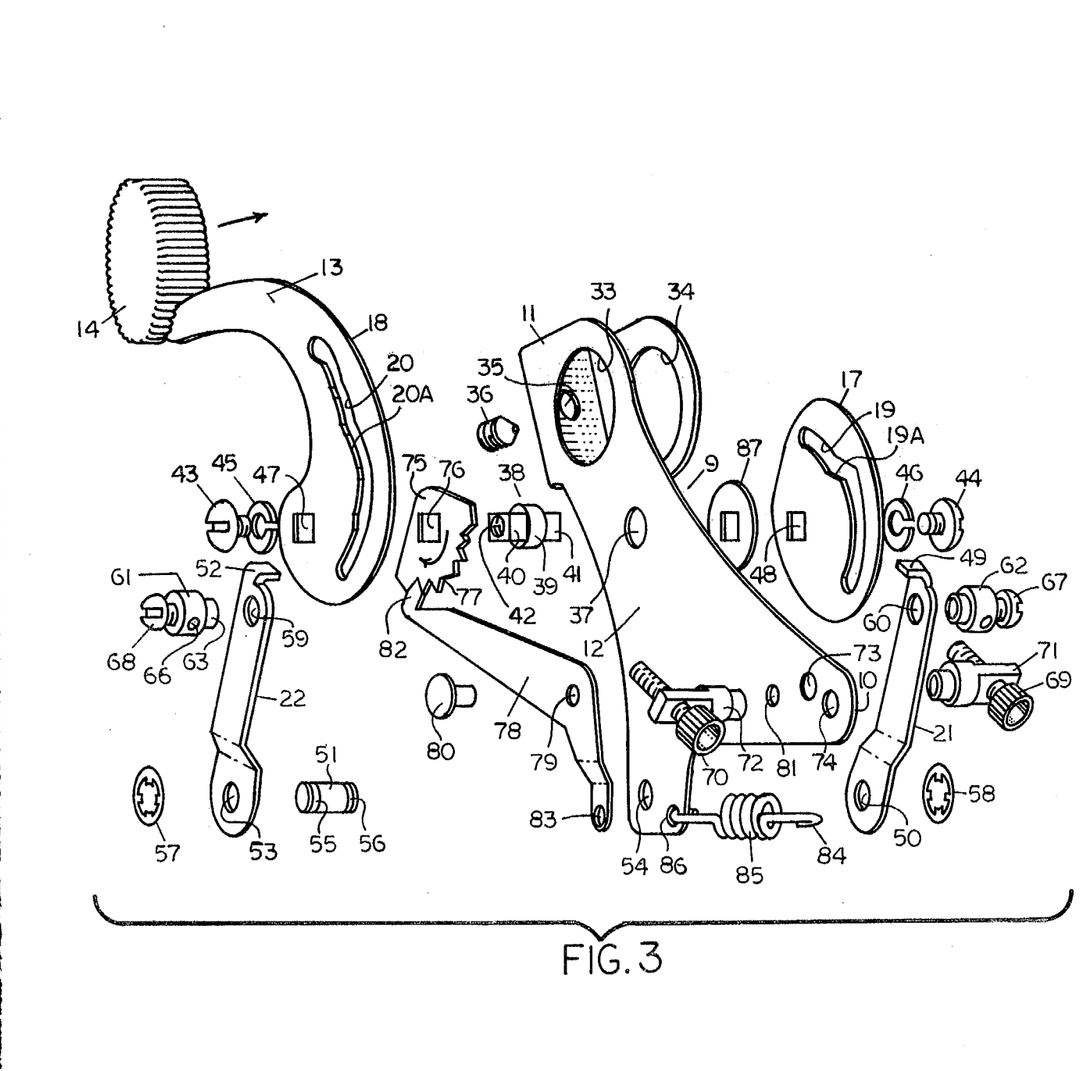
FIG. 3 is an exploded perspective view of the gearshift showing its parts separated and the order of their assembly.

Referring now to FIG. 3, the support bracket 9 is formed at its rearward end 11 to provide corresponding holes 33, 34 for receipt of the bicycle's handlebar, and a threaded hole 35 for receipt of a setscrew 36 that is to be turned into the hole 35 and jammed against that portion of the handlebar that is located between the holes 33, 34 for securing the rearward portion 11 of the support bracket 9 onto the handlebar.

Figure 4:
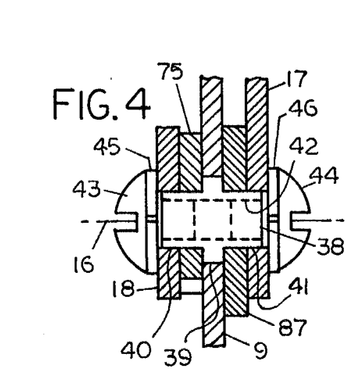
FIG. 4 is an enlarged detail view of a first subassembly of FIG. 3, taken on the line 4—4 of FIG. 1, some of the elements being in elevation and others being in cross-section, dashed lines being used to show hidden portions.

The support bracket 9 is provided with a hole 37 for receipt of a cam pivot indicated generally as 38 and which is shown enlarged in FIG. 4 where it will be seen that the cylindrical center portion 39, FIG. 3 of the cam pivot 38 is, in FIG. 4, centered in the support bracket 9 and the square end portions 40, 41, FIG. 3, in FIG. 4 project on opposite sides of the support bracket 9. The cam pivot 38 is provided with a threaded hole 42 that extends all the way through the cam pivot 38 and is centered on its longitudinal axis 16 -this is the horizontal axis 16 of FIG. 2 and also the "common reference" relative to which the drive ratio points on the guide surfaces 19, 20 are located. The hole 42 in cam pivot 38 is threaded to receive screws 43, 44 in its opposite ends, these screws being provided with lock washers 45, 46, respectively. Cams 18, 17, FIG. 3 are provided with square holes 47, 48 that correspond with the square ends 40, 41, respectively, of cam pivot 38 so that the cams remain fixed in position relative to each other but are rotatable with the cam pivot; the cams 18, 17 being secured by screws 43, 44, respectively. Part 87 is just a spacer washer that slips onto the square end 41 of the cam pivot to space the cam 17 from the support bracket 9.

The first cam follower 21, FIG. 3 has a tab 49 at its upper end that rides on the first guide surface 19 of cam 17. A hole 50 is provided at the lower end of cam follower 21 for attachment of the cam follower onto one end of the cam follower pivot 51. The second cam follower 22 has a tab 52 at its upper end that rides on the second guide surface 20 of cam 18. A hole 53 is provided at the lower end of cam follower 22 for attachment of the cam follower onto the opposite end of the cam follower pivot 51.

Figure 5:
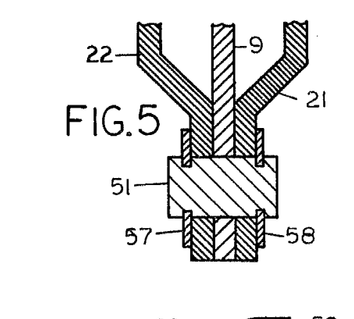
FIG. 5 is an enlarged detail view of a second subassembly of FIG. 3, taken on the line 5—5 of FIG. 1, the elements represented being in cross-section.

The cam follower pivot 51, FIGS. 3 and 5, is centered in a hole 54, FIG. 3 in the support bracket 9 with its ends -which are provided with grooves 55, 56- projecting on opposite sides of the support bracket 9 as shown in FIG. 5; the cam followers 22, 21, FIG. 5 being secured in place by means of retaining rings 57, 58, FIGS. 3 and 5 that snap into the grooves 55, 56, respectively, of the cam follower pivot 51. The cam followers are thereby pivotably secured to the support bracket in such arrangement that they are free only to follow the configuration of the guide surfaces with which they cooperate and they are pivotable independently of each other.

Figure 6:
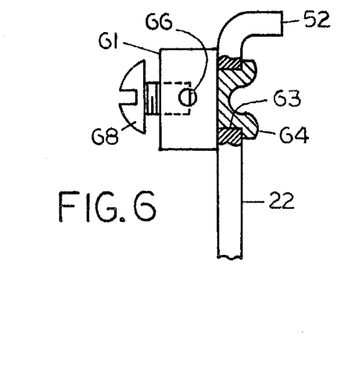
FIG. 6 is an enlarged detail view of a third subassembly of FIG. 3, taken on the line 6—6 of FIG. 1.

The cam followers 22, 21 are also provided with holes 59, 60 into which cable anchoring devices 61, 62 are secured, respectively. The cable anchoring devices are identical and are secured to their respective cam followers in the same way, cable anchoring device 61 being shown in enlarged detail in FIG. 6 by way of example. In FIG. 6, a shank portion 63 of cable anchoring device 61 has been fitted into the hole 59, FIG. 3 in cam follower 22, the shank portion 63 having then been formed into a flange 64, FIG. 6 that secures the cable anchoring device 61 in place, but with freedom to pivot in the hole 59, FIG. 3 in cam follower 22.

The cable anchoring devices 62, 61 include holes 65, 66 that extend all the way through their diameter for receipt of the first and second cable means 26, 28, FIG. 2, respectively; the first and second cable means 26, 28 being fixed in place by screws 67, 68, respectively. See also FIG. 6 which shows the screw 68 turned into cable anchoring device 61 far enough that the inner end of the screw 68 obstructs the hole 66 thereby functioning as a clamp on a wire (not shown) that would be inserted in the hole 66.

The cable casings 29, 30, FIGS. 1 and 2 are secured to the forward portion 10 of the support bracket 9 by means of cable tension adjustment screws 69, 70, respectively, FIGS. 1 and 3, into which one end of each casing is inserted, each of the cable tension adjustment screws 69, 70 being provided with a smaller diameter hole (not shown) that extends longitudinally all the way through each cable tension adjustment screw for passage of the first and second cable means 26, 28, respectively.

The cable tension adjustment screws 69, 70, FIG. 3 are screwed into support arms 71, 72 that are secured in holes 73, 74, respectively, in the forward portion 10 of the support bracket 9 in the same way as the cable anchoring device 61, FIG. 6 is secured.

The indexing detent means previously referred to comprises a rachet wheel 75 having a square hole 76 that corresponds with the square end 40 of cam pivot 38 so that the rachet wheel 75 necessarily turns with the cams and the lever but is fixed in position relative to same. Part of the perimeter of the rachet wheel 75 has a sharp sawtooth configuration that provides six valleys such as 77. The angular separation between these six valleys corresponds with the angular separation of the six radial reference lines that are superimposed upon each cam in FIG. 2 and mark the six drive ratio positions in which the cams can be placed; the rachet wheel 75 being shown in FIG. 3 engaged with a rachet lever 78 in drive ratio position (1). When the lever 13 is pushed forwardly in the direction of the adjacent arrow, the rachet wheel 75 is rotated in the direction of the arrow that is superimposed upon the rachet wheel 75, FIG. 3.

The rachet lever 78 has a hole 79 in it for receipt of a rivet 80 that also registers with a hole 81 in the support bracket 9. The rivet 80 is fixed to the support bracket 9 in such manner that the rachet lever 78 is free to pivot on the shank of the rivet 80. The rachet lever 78 is pointed at its upper end 82 to center in any one of the valleys, such as 77, of the rachet wheel 75; the rachet lever 78 including a hole 83 at its lower end for receipt of one hook-shaped end 84 of an extension type rachet spring 85; the opposite end of the rachet spring 85 being hooked into a hole 86 in the support bracket 9.

In operation, the rachet spring 85 pulls the lower end of the rachet lever 78, causing the rachet lever 78 to pivot around the shank of the rivet 80, thereby urging the pointed upper end 82 of the rachet lever 78 into a positive but yieldable engagement with any one of the valleys, such as 77, of the rachet wheel 75. Because the peaks between the valleys are sharp, the pointed end 82 of the rachet lever 78 will not remain placed "point-topoint"; instead, the tendency will be for the pointed end 82 to slide off into one of the valleys on either side of a given peak, thereby positively placing the first and second guide surfaces 19, 20, respectively, and the lever 13 in one drive ratio position or another.

ADDITIONAL COMMENTS

1. Language is included in the appended claims to the effect that drive ratio points on a given guide surface that are located at different distance-locations have to differ sufficiently in distance-location that they necessarily program the intended different sprocket alignment positions of the transfer cage being controlled. The two front sprockets of a 10-speed bicycle are spaced further apart than any two adjacent rear sprockets. This means that it requires a greater movement of the front derailleur control cable to move the front transfer cage between adjacent sprockets than is required of the rear derailleur control cable to move the rear transfer cage between adjacent rear sprockets. The spacing between distance-locations FA, FB on cam 17 therefore, will ordinarily be greater than the spacing between distance-locations R1, R2, etc., on cam 18. But there is an additional factor to be considered. If the linkage means of the rear derailleur is a parallelogram mechanism, the rear transfer cage moves through a segment of an arc as opposed to moving in a straight line. This means that it may require a greater movement of the rear derailleur cable to move the rear transfer cage between certain adjacent rear sprockets than between certain other adjacent rear sprockets. It is necessary therefore that the spacing between the different distance-locations of the drive ratio points on a given guide surface be planned with foreknowledge of the spacing between the sprockets of the bicycle and the operating characteristics of the derailleur to be controlled.

2. It is clear from the preceding sections of this specification that the front and/or rear derailleur control cable means may comprise either a single cable wire with or without a casing as in the case of a spring-biased type of derailleur, or, a single cable wire with a casing as in the case of a push-pull type of positively positioned derailleur, or, what amounts to two cable wires either with or without casings as in the case of a pull-pull type of positively positioned derailleur. Since it is the structure of the gear-shift and its effect upon the transfer cages of the derailleurs that is central to the invention, and not the specific structure of the interconnecting cable means, the appended claims recite "means for attachment of . . . cable means" in language that is aimed at the essential function that enables the combination to achieve the desired unitary result conceived. This language is intended to cover all of the different types of cable means described in this paragraph and is believed to be sufficiently supported by the present disclosure. In any event, means for attachment of a pull-pull type of cable means is illustrated in the drawings of the previously filed application, Ser. No. 763,604.

3. The term "cam means" is used in the appended independent claims in the sense defined in Webster's New Collegiate Dictionary, 1977 edition: "A rotating or sliding piece that imparts motion to a roller moving against its edge or to a pin free to move in a groove on its face or that receives motion from such a roller or pin."

4. The "handle member" recited in the appended independent claims may be in the form of a twist-grip, an example being shown in the original application, Ser. No. 607,430; the gearshift being mounted either as shown or elsewhere on the bicycle. A twist-grip is not presently preferred because it does not provide sufficient leverage to enable the cyclist to comfortably overcome the considerable resistance presented by the bias spring of a spring-biased type of rear derailleur. But this objection would not apply if the gearshift were designed exclusively for the control of a positively positioned type of rear derailleur, particularly if both the front and rear derailleurs were of the positively positioned type.

5. On some bicycles a spring-biased front derailleur is used in which the bias spring such as 25, FIG. 2 herein, normally impels the front transfer cage toward the larger front sprocket B instead of toward the smaller front sprocket A. For such application cam 17 would be modified so that the distance-location FB is located at the greater radius and FA at the shorter radius.

6. An alternative "means for positively positioning" a cam follower of the gearshift relative to its cooperating guide surface is to connect a bias spring between the cam follower and the gearshift's support bracket in such arrangement that the bias spring forces the cam follower to follow the contour of the guide surface, the spring being strong enough to overcome the frictional resistance to being moved that may be offered by the transfer cage being controlled or the interconnecting cable means.

7. Another alternative "means for positively positioning" the cam follower comprises what amounts to a reversal of the structure shown in the accompanying drawings. For example, on cam 18, FIG. 1 the guide surfaces 20 and 20a can be formed on opposite faces of a narrow ridge that projects from the outboard side of cam 18, and the tab 52 can be provided with a notch that enables the tab 52 to straddle the ridge; the ridge being formed in the shape of a "T" at its ends to provide "limit means" for stopping the travel of the cam relative to the tab at the forwardmost and rearwardmost drive ratio positions.

8. The tabs on the cam followers represent the most economical means; rollers can be substituted for improved ease of operation.

9. Where a spring-biased derailleur is being controlled and particularly in the case of a spring-biased rear derailleur, the bias spring presents a substantially increased resistance the further one attempts to move the transfer cage in opposition to the effect of the bias spring. For improved ease of operation, the spacing between the drive ratio positions can be made progressively greater in the direction of increased resistance, so as to provide a more gradual incline between adjacent drive ratio points that are located at different distance-locations. This makes it easier for the cam followers to climb from one level to another; in effect, providing increased leverage.

I claim:

1. For use on a bicycle having multiple front sprockets that differ from each other in pitch diameter and are mounted for rotation together around a common pedal crank axis, multiple rear sprockets that differ from each other in pitch diameter and are mounted for rotation together around a common rear wheel axis, a closed loop of roller chain connecting together one each of said front and rear sprockets, a conventional front derailleur having a front transfer cage that is moved alternately in opposite directions between adjacent front sprocket alignment positions in response to a corresponding movement of a first cable means, and a conventional rear derailleur having a rear transfer cage that is moved alternately in opposite directions between adjacent rear sprocket alignment positions in response to a corresponding movement of a second cable means;

a semi-automatic gearshift in which the unitary result attained is characterized by a single handle member positioning cam means for simultaneous control of the sprocket alignment position of said front and rear transfer cages to mechanically program a progressive series of different drive ratio combinations of said front and rear sprockets; the mode of physical attainment comprising:

support means adapted for attachment to said bicycle;

cam means secured to said support means for placement in any one of multiple drive ratio positions, said cam means providing first and second guide surfaces that are placed in corresponding drive ratio positions, at each of said positions a given point on each of said guide surfaces being designated a drive ratio point, each such pair comprising a corresponding pair of drive ratio points;

the drive ratio points on said first guide surface being located relative to a first common reference on said cam means, at different distance-locations equal in number to the number of said front sprockets and differing sufficiently in distance-location that they program different front sprocket alignment positions of said front transfer cage;

the drive ratio points on said second guide surface being located relative to a second common reference on said cam means, at different distance-locations equal in number to the number of said rear sprockets and differing sufficiently in distance-location that they program different rear sprocket alignment positions of said rear transfer cage;

a handle member connected to said cam means for manual placement of said guide surfaces in any one of said drive ratio positions;

means to stabilize said handle member and said guide surfaces at any one of said drive ratio positions;

limit means to restrict said handle member and said guide surfaces to movement alternately in opposite directions between extreme opposite drive ratio positions;

a first cam follower secured to said support means and adapted to follow said first guide surface;

a second cam follower secured to said support means and adapted to follow said second guide surface;

the combination being so constructed and arranged that in each of said drive ratio positions when said first cam follower is aligned with a drive ratio point on said first guide surface said second cam follower is aligned with the corresponding drive ratio point on said second guide surface;

means for attachment of said first cable means to said first cam follower such that when the first cam follower is moved alternately in opposite directions said front transfer cage is moved alternately in opposite directions;

means for attachment of said second cable means to said second cam follower such that when the second cam follower is moved alternately in opposite directions said rear transfer cage is moved alternately in opposite directions;

said corresponding pairs of drive ratio points each programming a different drive ratio combination of said front and rear sprockets such that the lowest and highest drive ratio combinations are obtained at said extreme opposite drive ratio positions of said handle member and intermediate drive ratio combinations are obtained in consecutive increments ordered from said lowest to said highest drive ratio positions of said handle member.

2. In combination with claim 1, means for positively positioning said first cam follower relative to said first guide surface functioning to ensure that said first cam follows followers said first guide surface.

3. In combination with claim 1, means for positively positioning said second cam follower relative to said second guide surface functioning to ensure that said second cam follower follows said second guide surface.

4. A combination as recited in claim 1, where said bicycle has two front sprockets, the smaller and larger pitch diameter front sprockets being identified for reference herein as (A) and (B) respectively, and five rear sprockets identified for reference herein as (1), (2), (3), (4), (5) counting from the largest to the smallest pitch diameter rear sprocket, in which the unitary result attained is further characterized by the cam means programming a progressive series restricted to the six drive ratio combinations A-1, A-2, A-3, B-3, B-4, B-5; physically attained by:

said cam means providing only six drive ratio positions and thereby providing six pairs of corresponding drive ratio points, the drive ratio positions being numbered for reference herein one, two, three, eight, nine, ten; positions one and ten being said extreme opposite drive ratio positions;

on said first guide surface, the six drive ratio points being located at two different distance-locations (FA) and (FB); the three drive ratio points in drive ratio positions one, two, three being located at distance-location (FA) and programming the alignment of said front transfer cage with front sprocket (A), and the three drive ratio points in drive ratio positions eight, nine, ten being located at distance-location (FB) and programming the alignment of said front transfer cage with front sprocket (B);

on said second guide surface, the six drive ratio points being located at five different distance-locations (R1), (R2), (R3), (R4), (R5); the drive ratio points in drive ratio positions one, two, nine and ten being located at distance-locations (R1), (R2), (R4), (R5) and programming the alignment of said rear transfer cage with rear sprockets (1), (2), (4), (5) respectively; and the drive ratio points in drive ratio positions three and eight both being located at distance-location (R3) and programming the alignment of said rear transfer cage with rear sprocket (3).

* * * * *

UNITED STATES PATENT AND TRADEMARK OFFICE
CERTIFICATE OF CORRECTION

PATENT NO. : 4,201,095
DATED      : May 6, 1980
INVENTOR(S) : Salvatore Cirami, Long Island City, N.Y.

It is certified that error appears in the above—identified patent and that said Letters Patent is hereby corrected as shown below:

In Related U.S. Application Data, Ser. No. 607,432 should be corrected to read: 607,430.

In the specification, column 1, line 9, Ser. No. 607,432 should be corrected to read: 607,430.

In the claims, claim 2, line 4, "follows followers" should be corrected to read: "follower follows".

Signed and Sealed this

Fourth Day of November 1980

[SEAL]

Attest:

SIDNEY A. DIAMOND

Attesting Officer

Commissioner of Patents and Trademarks